United States Patent
Freis et al.

(10) Patent No.: US 10,156,251 B2
(45) Date of Patent: Dec. 18, 2018

(54) RECESSED SPRING WASHER FLOW DRILL SCREW

(71) Applicant: Ford Global Technologies, LLC, Dearborn, MI (US)

(72) Inventors: Amanda Kay Freis, Ann Arbor, MI (US); Garret Sankey Huff, Ann Arbor, MI (US); Thomas Norton, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 49 days.

(21) Appl. No.: 15/343,299

(22) Filed: Nov. 4, 2016

(65) Prior Publication Data

US 2018/0128305 A1    May 10, 2018

(51) Int. Cl.
| | |
|---|---|
| F16B 39/26 | (2006.01) |
| F16B 39/284 | (2006.01) |
| F16B 5/02 | (2006.01) |
| F16B 43/00 | (2006.01) |
| F16B 25/00 | (2006.01) |
| F16B 25/10 | (2006.01) |
| F16B 31/04 | (2006.01) |

(52) U.S. Cl.
CPC .............. *F16B 39/26* (2013.01); *F16B 5/02* (2013.01); *F16B 25/0015* (2013.01); *F16B 25/0021* (2013.01); *F16B 25/0084* (2013.01); *F16B 25/106* (2013.01); *F16B 31/043* (2013.01); *F16B 39/284* (2013.01); *F16B 43/001* (2013.01)

(58) Field of Classification Search
CPC .. F16B 5/02; F16B 39/24; F16B 39/26; F16B 39/284; F16B 43/00; F16B 43/001

USPC ..... 411/6, 10, 172, 184, 185, 186, 368, 370, 411/371.2, 424

See application file for complete search history.

(56) References Cited

U.S. PATENT DOCUMENTS

| | | | | |
|---|---|---|---|---|
| 2,289,066 | A * | 7/1942 | Olson | F16B 39/26 411/163 |
| 3,037,221 | A * | 6/1962 | Lanius, Jr. | B23P 19/08 29/511 |
| 3,056,443 | A * | 10/1962 | Knocke | F16B 39/284 411/186 |
| 3,221,792 | A * | 12/1965 | Poupitch | F16B 39/24 411/134 |
| 3,286,579 | A * | 11/1966 | Lovisek | F16B 25/0021 411/386 |
| 3,888,289 | A * | 6/1975 | Reynolds | F16B 39/26 411/134 |
| 4,293,256 | A * | 10/1981 | Pamer | F16B 31/024 411/11 |

(Continued)

FOREIGN PATENT DOCUMENTS

| | | |
|---|---|---|
| DE | 19712180 | 9/1998 |
| JP | 2002070829 | 3/2002 |

*Primary Examiner* — Roberta S Delisle
(74) *Attorney, Agent, or Firm* — Burris Law, PLLC

(57) ABSTRACT

A screw for use in joining workpieces, for example automotive body parts, is provided that includes a head portion, an externally threaded shank extending from the head portion, a flow-hole-forming tip disposed at a distal end portion of the externally threaded shank, and a recessed spring washer disposed under the head portion. The recessed spring washer is configured to apply a clamping load to joined workpieces as they expand and contract.

14 Claims, 5 Drawing Sheets

(56) References Cited

U.S. PATENT DOCUMENTS

| | | | | |
|---|---|---|---|---|
| 4,498,825 A | * | 2/1985 | Pamer | F16B 31/024 |
| | | | | 411/11 |
| 4,516,893 A | * | 5/1985 | Barth | F16B 25/0021 |
| | | | | 411/184 |
| 5,234,301 A | * | 8/1993 | Grossberndt | B21J 5/066 |
| | | | | 411/386 |
| 5,316,319 A | | 5/1994 | Suggs | |
| 5,487,633 A | * | 1/1996 | Roberts | B21H 3/027 |
| | | | | 411/187 |
| 5,746,039 A | * | 5/1998 | Nystrom | E04C 3/04 |
| | | | | 411/387.1 |
| 5,919,020 A | * | 7/1999 | Walther | F16B 5/0275 |
| | | | | 411/368 |
| 6,338,600 B2 | | 1/2002 | Friederich et al. | |
| 6,789,989 B2 | * | 9/2004 | Walther | F16B 35/06 |
| | | | | 411/186 |
| 6,874,986 B2 | * | 4/2005 | Koppel | F16B 25/0094 |
| | | | | 411/386 |
| 7,377,734 B2 | * | 5/2008 | Bechtel, Jr. | B21K 1/56 |
| | | | | 411/386 |
| 7,682,118 B2 | * | 3/2010 | Gong | F16B 25/0047 |
| | | | | 411/387.1 |
| 8,857,040 B2 | | 10/2014 | Freis | |
| 9,168,076 B2 | | 10/2015 | Patty et al. | |
| 9,488,210 B2 | * | 11/2016 | Freis | F16B 25/0021 |
| 2015/0063944 A1 | | 3/2015 | Maloney et al. | |
| 2015/0101458 A1 | | 4/2015 | Saje et al. | |

* cited by examiner

RECESSED SPRING WASHER FLOW DRILL SCREW

FIELD

The present disclosure relates generally to fasteners and more particularly to fasteners for use in joining adjacent workpieces with one-sided access.

BACKGROUND

The statements in this section merely provide background information related to the present disclosure and may not constitute prior art.

A variety of structures being joined often require one-sided joining techniques in order to create efficient assemblies. One such technique for one-sided joining is flow-drill screwing (FDS) where a threaded fastener is screwed into a joint and the "nut" is created in situ during the insertion process. When installing a flow-drill screw in thick materials or dissimilar materials, a clearance hole can be used. In addition, with thick gauge material stack-ups, or when a top layer of sheet metal is thicker than a governing size (e.g., >2 mm), a clearance hole can be used in the top layer of the material.

Often times, an adhesive is used in conjunction with a flow-drill screw. When using an adhesive in a joint, there is concern of torque fall-off. Torque fall of is also a concern when using polymer based substrate materials. Torque fall-off occurs where the torque may relax after the joint is tightened to a specific torque. After the joined parts go through paint processes and the adhesive cures, there may be a concern that the torque has changed in the joint.

This torque fall-off issue in joined assemblies, among other mechanical joining issues, is addressed by the present disclosure.

SUMMARY

In one form of the present disclosure, a screw is provided that comprises a head portion, an externally threaded shank extending from the head portion, a flow-hole-forming tip disposed at a distal end portion of the externally threaded shank, and a recessed spring washer disposed under the head portion. In one form, the recessed spring washer defines a spring rate sufficient to prevent torque fall-off.

According to various forms of this screw, the recessed spring washer is integrally formed with the head portion, and the head portion may define a tool engagement feature such as a hexagon. The recessed spring washer may also be a different material than the head portion, externally threaded shank, and the flow-hole forming tip. In another form, the recessed spring washer defines a flange extending at least 90° from a longitudinal axis and a proximal end portion of the screw and may also define a flat distal face. In still another form, the screw defines regions of varying hardness.

In another form, a screw is provided that comprises a head portion, an externally threaded shank extending from the head portion, a flow-hole-forming tip disposed at a distal end portion of the externally threaded shank, and a recessed spring washer disposed under the head portion, the concave washer defining a flange extending at least 90° from a longitudinal axis and a proximal end portion of the screw, wherein the recessed spring washer defines a spring rate sufficient to prevent torque fall-off.

In still another form, an assembly is provided that comprises a plurality of workpieces and a screw disposed between the workpieces. The screw comprises a head portion, an externally threaded shank extending from the head portion, a flow-hole-forming tip disposed at a distal end portion of the externally threaded shank, and a recessed spring washer disposed under the head portion. The workpieces may be a material selected from the group consisting of aluminum, polymers, and polymer composites, among others.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
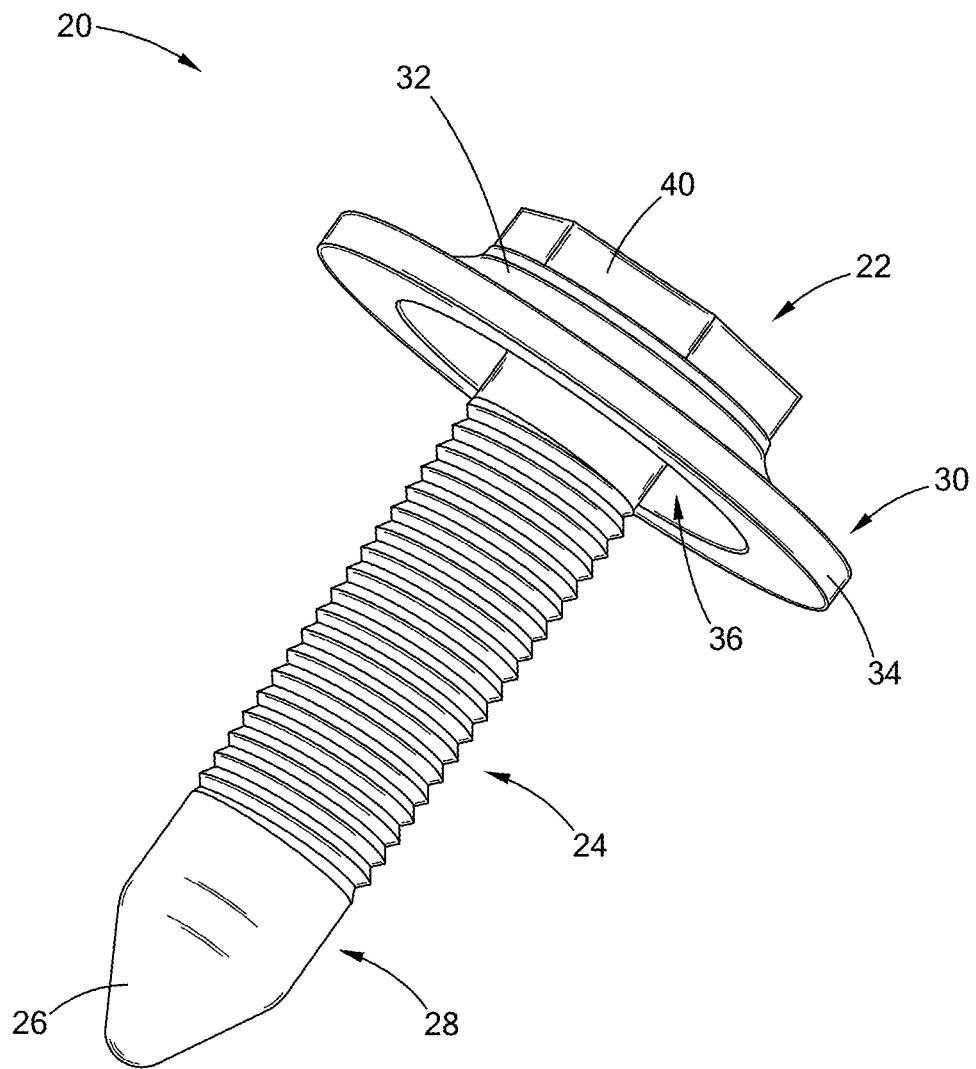
FIG. 1 is a perspective view of a screw constructed in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
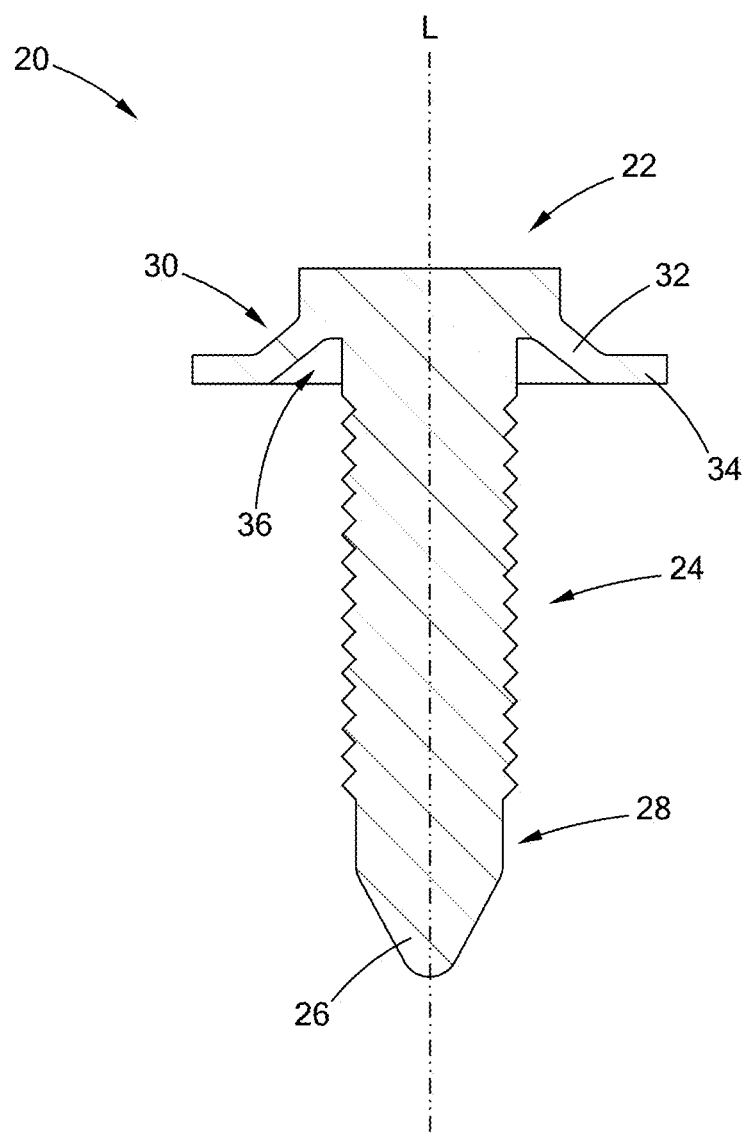
FIG. 2 is a cross-sectional view of the screw of FIG. 1.

Referring to FIGS. 1 and 2, a screw according to the principles of the present disclosure is illustrated and generally indicated by reference numeral 20. The screw 20 comprises a head portion 22, an externally threaded shank 24 extending from the head portion 22, a flow-hole forming tip 26 disposed at a distal end portion 28 of the externally threaded shank 24, and a recessed spring washer 30 disposed under the head portion 22. The recessed spring washer 30 includes a sidewall 32 extending from the head portion 22, down to a flange 34, which extends away from a longitudinal axis L of the screw 20. Further, a recess 36 is disposed generally under the head portion 22 as shown.

The recessed spring washer 30 is generally similar to a "Belleville" washer, in that the sidewall 32 and flange 34 are configured to elastically deform with application of torque to the head portion 22 and thus act as a spring to apply and maintain a load to workpieces being joined, as described in greater detail below. Preferably, the recessed spring washer 30 defines a spring rate sufficient to prevent torque fall-off after the workpieces are joined and throughout thermal expansion and contraction of the joint.

The recessed spring washer 30 may be integrally formed with the head portion 22 as shown, or alternately, the recessed spring washer 30 may be a separate part or component. The recessed spring washer 30 may also be a different material than the head portion 22, the externally threaded shank 24 and/or the flow-hole forming tip 26.

The head portion 22 defines a tool engagement feature 40, which in this form is a hexagon geometry. Other tool engagement features such as slotted, socket, or hexalobular (Torx), among others, may also be employed. The tool engagement feature 40 may be external as shown, or the tool engagement feature 40 may be internal to the head portion 22 while remaining within the scope of the present disclosure.

Figure 3A:
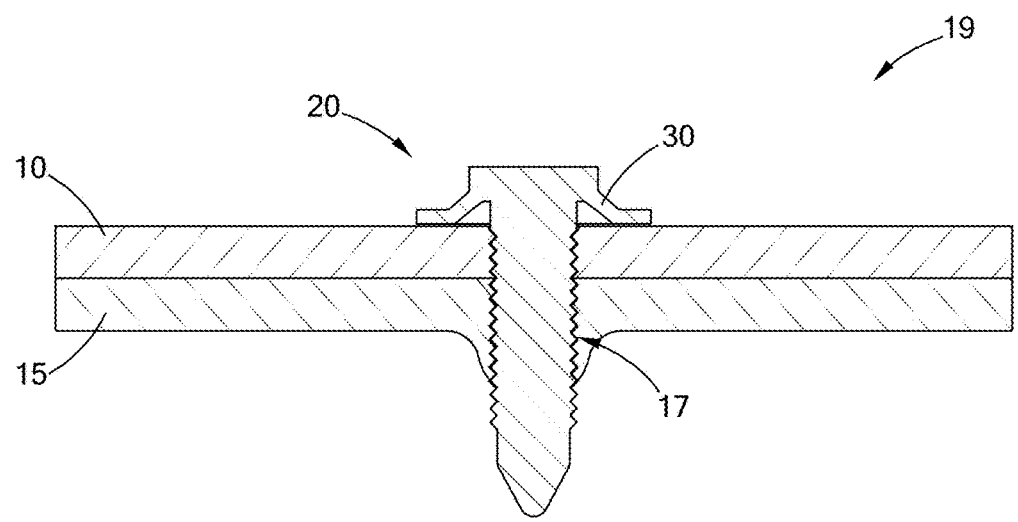
FIG. 3A is a cross-sectional view of an assembly joined by the screw of FIG. 1.
Figure 3B:
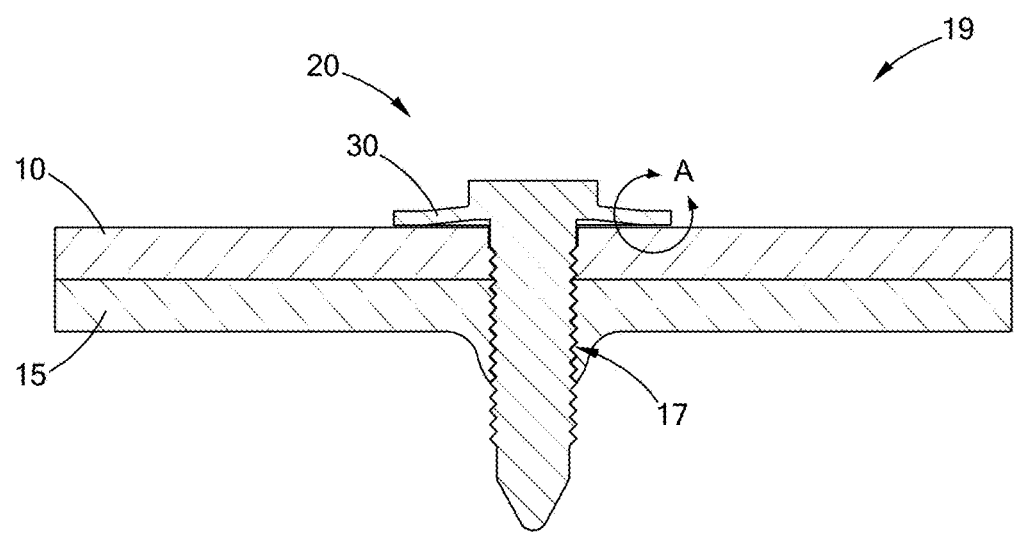
FIG. 3B is a cross-sectional view of an assembly joined by the screw of FIG. 1 and having the recessed spring washer elastically deformed in accordance with the teachings of the present disclosure.

Referring now to FIGS. 3A and 3B, the screw 20 is installed in workpieces 10 and 15, with integrally formed threads 17 in the workpieces 10/15 from the flow-drill screwing process to form a joint 19. As the joint 19 expands and contracts, the recessed spring washer 30 flexes, or elastically deforms, and continues to apply a clamping load to the joint 19. FIG. 3A shows the screw 20 continuing to apply a clamping load as the joint 19 expands, and FIG. 3B shows the screw 20 continuing to apply a clamping load as the joint 19 contracts.

Figure 4:
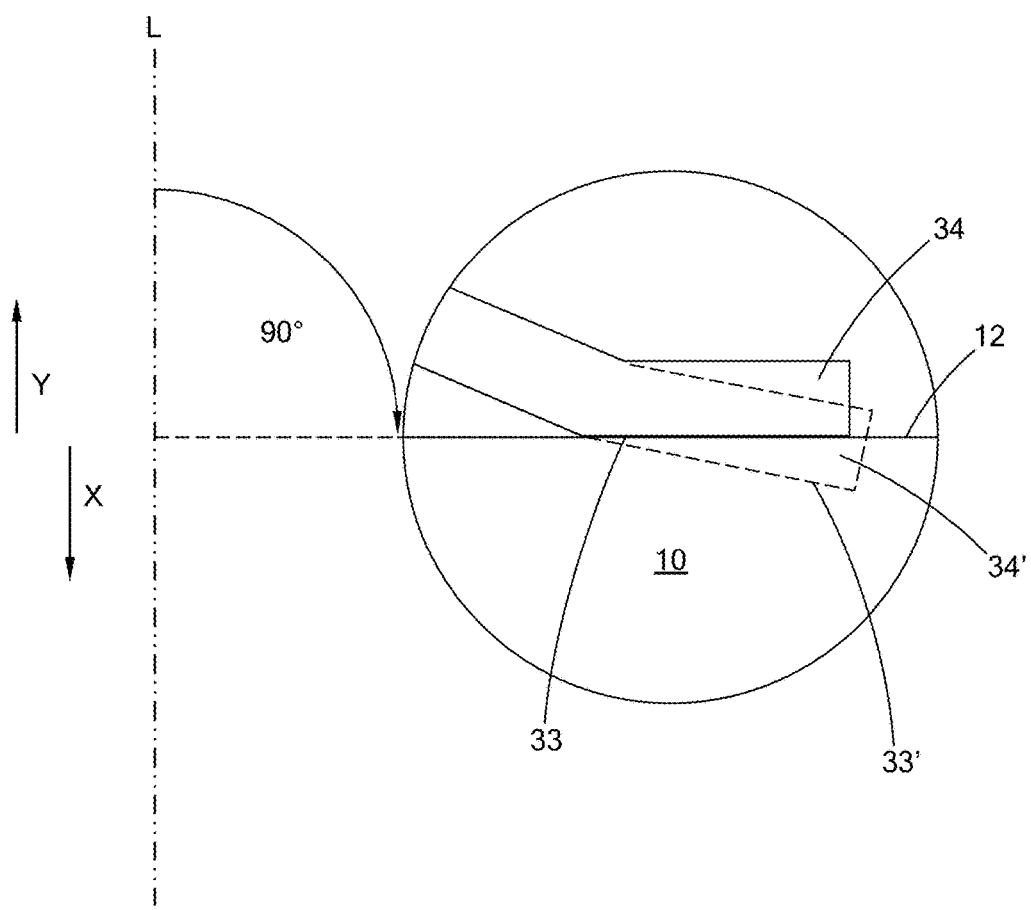
FIG. 4 is a detail view, from detail A of FIG. 3B, of a flange of the screw interfacing with a workpiece in accordance with the teachings of the present disclosure.

Referring now to FIG. 4, a detail of the flange 34 mating against the workpiece 10 is shown in greater detail. The flange 34 in this form extends at least 90° from the longitudinal axis L and a proximal end portion of the screw 20. As used herein, the term "distally" or "distal" shall be construed to be in the direction of arrow X, and the term "proximally" or "proximal" shall be construed to be in the direction of arrow Y.

Alternately, the flange 34 may extend greater than 90° as shown by the dashed lines, and thus the flange 34' will remain in good sealing contact with an upper surface 12 of the workpiece 10. In these forms, the flange 34/34' defines a flat distal face 33/33' so as to maintain an improved seal between the flange 34/34' and the workpiece 10. An improved sealing interface is important when the workpieces 10/15 undergo various cleaning/dipping operations prior to paint such that debris does not enter the joint 19 and provide a source of corrosion or another form of a defect.

The screw 20 may be any of a variety of materials and in one form is a high strength steel such as boron. In another form, the screw is an aluminum material such as a 7000 series aluminum. Other materials that can function with the recessed spring washer 30 and withstand various processing conditions may also be employed while remaining within the scope of the present disclosure.

The workpieces 10/15 may be any of a variety of materials, including by way of example, aluminum, polymers, and polymer matrix composite materials. The reinforcements in the composite materials may be carbon fiber, glass fiber, or another material, and may be in a continuous or discontinuous form. It should be understood that these materials are merely exemplary and any material may be used for the workpieces 10/15 while remaining within the scope of the present disclosure.

Figure 5:
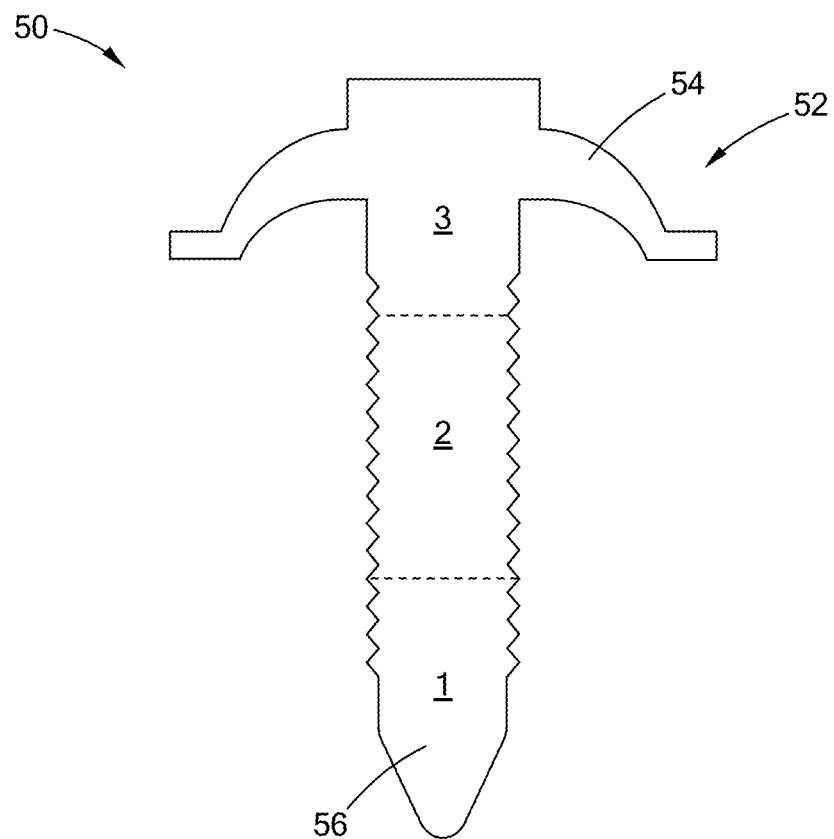
FIG. 5 is a cross-sectional view of alternate forms of the screw constructed in accordance with the teachings of the present disclosure.

Referring now to FIG. 5, additional forms of a screw according to the teachings of the present disclosure are illustrated and generally indicated by reference numeral 50. The screw 50 includes a recessed spring washer 52 with a slightly different geometry for the sidewall 54, namely a curved/arcuate shape as shown. It should be understood that this alternate geometry is meant to illustrate that any of a number of shapes for the recessed spring washer 30/52 may be employed provided the spring washer 30/52 is capable of applying a clamping load as the joint 19 expands and contracts, and preferably prevents torque fall-off.

As further shown in FIG. 5, the hardness of the screw 50 may be tailored in different regions 1, 2, and 3, wherein the region 1 would have a higher hardness in the region of the flow-hole forming tip 56 in order to better withstand the flow-drilling process. Region 2 may be of a lower hardness, and region 3 even a lower hardness in order to provide the requisite spring characteristics for the recessed spring washer 52.

Accordingly, the present disclosure provides an innovative fastener for joining workpieces having one/single-sided access and to inhibit torque fall-off. The invention is particularly useful when joining composites to metals, and more specifically carbon fiber composite to aluminum. Flow-drill screwing employing the unique features of the fasteners illustrated and described herein allows for high-volume, single-sided joining, especially for joints comprising composites and metals.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A screw comprising:
   a head portion;
   an externally threaded shank extending from the head portion;
   a flow-hole-forming tip disposed at a distal end portion of the externally threaded shank; and
   a recessed spring washer defining a flange having a flat distal face and disposed under the head portion with a spring rate sufficient to prevent torque fall-off and deforms with application of torque to the head portion.

2. The screw according to claim 1, wherein the recessed spring washer is integrally formed with the head portion.

3. The screw according to claim 1, wherein the head portion defines a tool engagement feature.

4. The screw according to claim 1, wherein the recessed spring washer is a different material than the head portion, externally threaded shank, and the flow-hole forming tip.

5. The screw according to claim 1, wherein the flange of the recessed spring washer extends at least 90° from a longitudinal axis and a proximal end portion of the screw.

6. The screw according to claim 1, wherein the screw is a material selected from the group consisting of boron steel and 7000 series aluminum.

7. The screw according to claim 1, wherein the screw defines regions of varying hardness.

8. A screw comprising:
   a head portion;
   an externally threaded shank extending from the head portion;
   a flow-hole-forming tip disposed at a distal end portion of the externally threaded shank; and
   a recessed spring washer disposed under the head portion, the recessed spring washer defining a flange having a flat distal face so as to maintain an improved seal between the flange and a workpiece, the flange extending at least 90° from a longitudinal axis and a proximal end portion of the screw,
   wherein the recessed spring washer defines a spring rate sufficient to prevent torque fall-off and deforms with application of torque to the head portion, thereby applying and maintaining a load workpieces being joined by the screw.

9. The screw according to claim 8, wherein the screw defines regions of varying hardness.

10. An assembly comprising:
a plurality of workpieces;
a screw disposed between the workpieces comprising:
a head portion;
an externally threaded shank extending from the head portion;
a flow-hole-forming tip disposed at a distal end portion of the externally threaded shank; and
a recessed spring washer defining a flange having a flat distal face and disposed under the head portion with a spring rate sufficient to prevent torque fall-off and deforms with application of torque to the head portion.

11. The assembly according to claim 10, wherein the workpieces are a material selected from the group consisting of aluminum, polymers, and polymer matrix composite material.

12. The assembly according to claim 10, wherein the recessed spring washer of the screw defines a flange extending at least 90° from a longitudinal axis and a proximal end portion of the screw.

13. The assembly according to claim 10, wherein the recessed spring washer is integrally formed with the head portion.

14. A motor vehicle comprising the assembly according to claim 10.

* * * * *